(12) United States Patent
Burlak et al.

(10) Patent No.: US 7,064,658 B2
(45) Date of Patent: Jun. 20, 2006

(54) INTEGRATED VEHICLE POWER DISTRIBUTION AND GATEWAY SYSTEM

(75) Inventors: Gary Burlak, Lake Orion, MI (US);
Rod S Fraser, Decatur, AL (US);
Michael A Cox, Athens, AL (US);
Marian Mirowski, West Bloomfield, MI (US); Michael C Long, Rochester, MI (US); Bradley S Chupp, Madison, AL (US); Frank Trovato, Holly, MI (US); John M Gaynier, Carleton, MI (US); Luis J Morenilla, Huntsville, AL (US); Peter J Narbus, Huntsville, AL (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 111 days.

(21) Appl. No.: 10/794,990

(22) Filed: Mar. 5, 2004

(65) Prior Publication Data

US 2004/0189092 A1    Sep. 30, 2004

Related U.S. Application Data

(60) Provisional application No. 60/453,300, filed on Mar. 10, 2003.

(51) Int. Cl.
*B60R 25/10* (2006.01)
(52) U.S. Cl. ............... 340/428; 340/635; 340/636.16; 340/662; 340/657; 340/663; 340/664; 361/93.2; 361/93.9
(58) Field of Classification Search ............... 340/428, 340/438, 455, 635, 636.1, 636.16, 638, 644, 340/664, 825.57, 657, 662, 663; 361/18, 361/20, 87, 93.2, 93.9, 86; 307/10.1, 150
See application file for complete search history.

(56) References Cited

U.S. PATENT DOCUMENTS

| 4,354,241 A * | 10/1982 | Barello ..................... 700/296 |
| 6,263,269 B1 * | 7/2001 | Dannenberg .................. 701/29 |
| 2003/0197993 A1 | 10/2003 | Mirowski et al. |

* cited by examiner

*Primary Examiner*—Hung Nguyen
(74) *Attorney, Agent, or Firm*—Ralph E. Smith

(57) ABSTRACT

A universal vehicle electric power distribution module employs reconfigurable inputs and outputs enabling use of the same hardware across vehicle lines. The module is scalable for ease of expansion and is capable of handling both low current and high current load management on the same module.

15 Claims, 2 Drawing Sheets

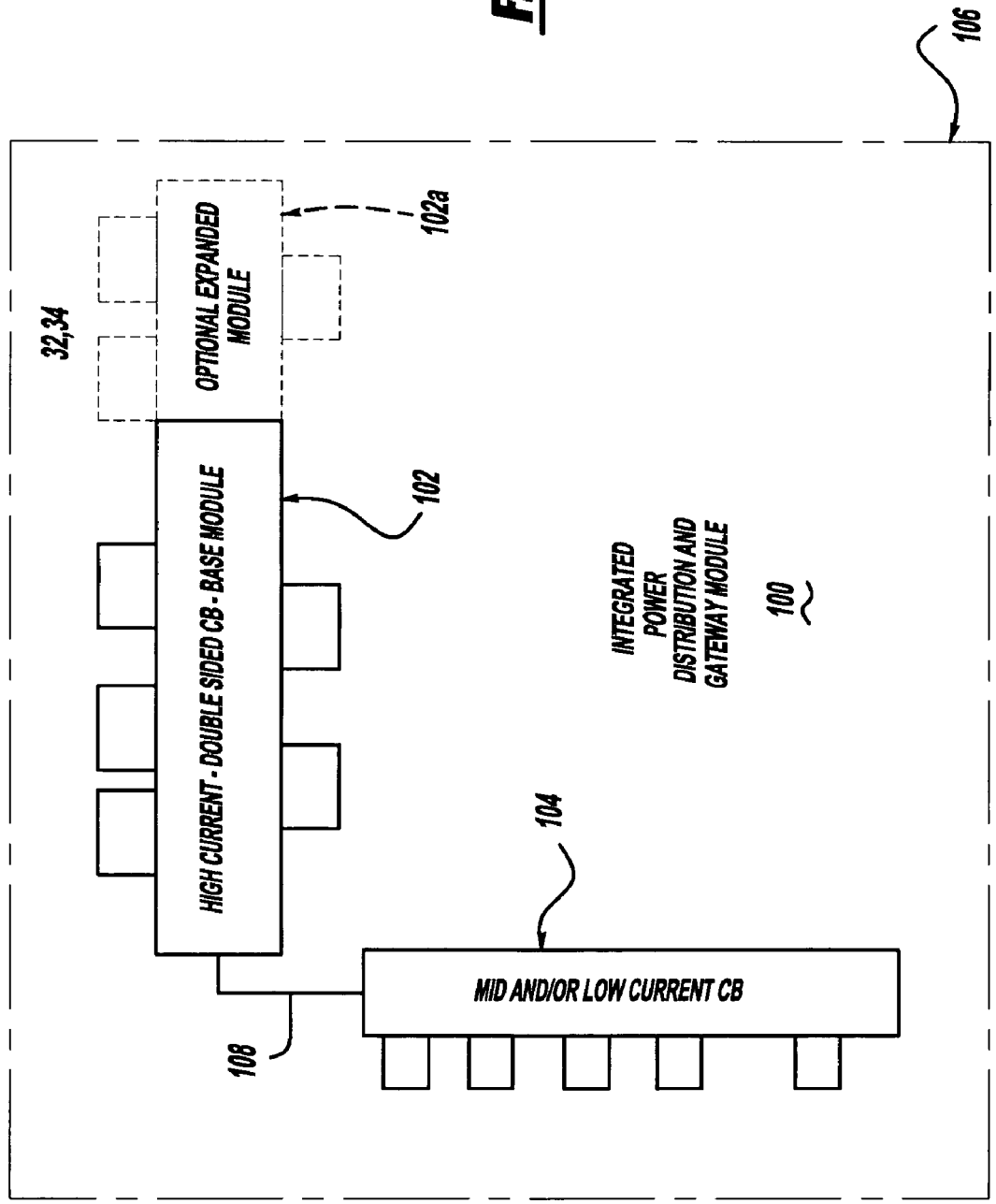

INTEGRATED VEHICLE POWER DISTRIBUTION AND GATEWAY SYSTEM

CROSS-REFERENCE TO RELATED APPLICATION

This application claims the benefit of U.S. Provisional Application No. 60/453,300 filed Mar. 10, 2003.

FIELD OF THE INVENTION

The present invention relates generally to both vehicle electrical power management and vehicle communication controls.

BACKGROUND ART

Generally, motor vehicles typically include one or more systems arranged to control operation of various vehicle electrical loads as needed or demanded during operation of the vehicle. Such systems are typically arranged as power modules, one or more of which are located in various areas in the vehicle. These modules are generally connected to the vehicle's electrical power supply, and include control circuitry responsive to inputs from various control switches and/or control devices to selectively connect various output loads to the vehicle's power system as needed/desired. For example, operation of a turn signal indicator lever inside the vehicle creates an input signal received at a power module, which in turn through a set of electro-mechanical relays and/or other electrical switching elements, sends electrical power to the appropriate turn signal indicator lamp. In this manner, the power module acts as a centralized electrical power switching device to facilitate management and control of various electrical components/loads on the vehicle.

In addition to control of electrical power, electrical components and controllers located in vehicles are generally connected to at least one communication bus to facilitate exchange and communication of data throughout the vehicle. For example, two such available communication bus arrangements are the J1850 communication bus and the CAN communication bus arrangement. In addition, it is possible to utilize more than one bus in a vehicle. For example, each bus can operate at different multiplex speeds. Known arrangements include the CAN A, CAN B, and CAN C buses.

To allow communication of information between buses of varying speeds, and/or to permit external service diagnostic equipment to tap into the communication bus(es), it is generally known to incorporate a gateway arrangement into the communication bus structure. The gateway operates as: (1) a portal to facilitate data transfer between devices that communicate on one or more of the buses, e.g., at different bus speeds, and (2) a portal for connection to external diagnostic equipment.

To date, known vehicles employing integrated power modules and gateways have implemented such devices as separate modules and/or devices within the vehicle. Still further, these modules, particularly known power module arrangements, are generally custom configured to operate for specific vehicles. Accordingly, such control modules employ non-reconfigurable inputs and/or outputs, and are otherwise not scalable for use with other vehicle applications having additional electrical load requirements. Accordingly, a need exists for an arrangement that reduces the cost and complexity associated with separate power control modules and gateways, while also permitting reconfigurability and/or scalability of the system.

SUMMARY OF THE INVENTION

A universal vehicle electric power distribution module includes a plurality of reconfigurable module inputs and a microcontroller coupled for receipt of signals appearing at the module inputs. A plurality of reconfigurable module outputs are each operative, under control of the microcontroller, to selectively couple electrical power to a like plurality of electrical loads in the vehicle.

In another aspect of the invention, first and second current-rated types of loads may be served by the same universal power distribution module. Module outputs for the first current rating are placed on a circuit board separate from a board mounting outlets of the second current rating.

BRIEF DESCRIPTION OF THE DRAWINGS

The present invention will become more fully understood from the following description and the accompanying drawings, wherein:

FIG. 2 is a block diagram representing a cross-sectional view of an exemplary integrated power distribution and gateway module layout in accordance with another aspect of the present invention.

DESCRIPTION

Figure 1:
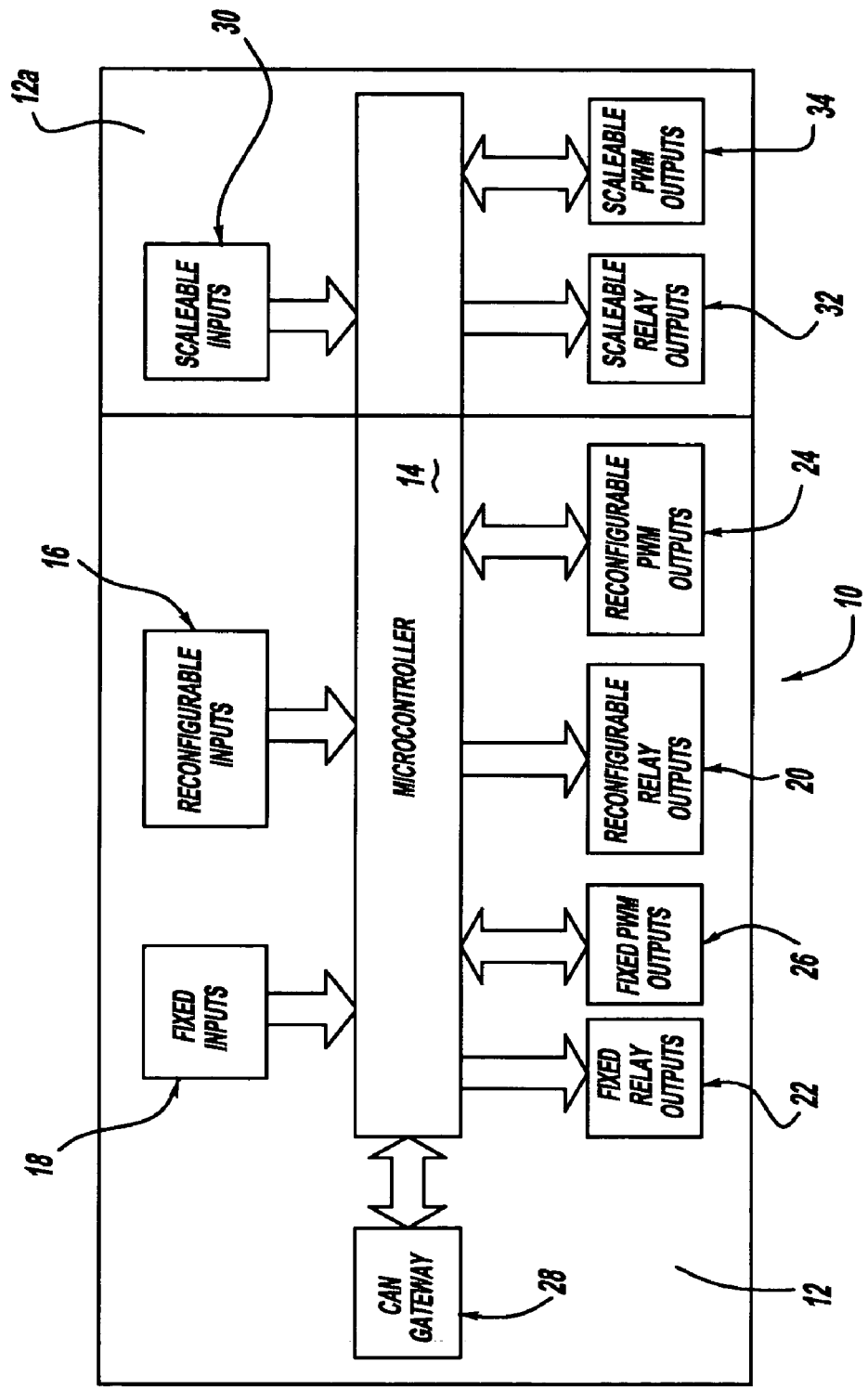
FIG. 1 is a block diagram showing an exemplary embodiment of a scalable, Totally Integrated Power Module ("TIPM") in accordance with one aspect of the present invention.

Referring to FIG. 1, a block diagram is provided showing an exemplary integrated power/gateway module 10 in accordance with one aspect of the present invention. More specifically, module 10 includes a base or common architecture in which a set of predetermined electrical loads (one or more electrical loads/vehicle content common to multiple vehicle models) are configured for control as a base configuration controller board 12. The base module includes a microcontroller based controller 14 arranged to receive input signals from at least one reconfigurable input connection 16, as well as one or more fixed input connections 18 (optional/as desired). Two types of outputs are provided from the controller 14, relay-type output connections, and pulse width modulated (PWM) type outputs. The relay outputs are reconfigurable (20) and/or fixed (22). Likewise, the PWM outputs are also reconfigurable (24) and/or fixed (26). While not to be construed as limiting, fixed inputs/outputs preferably include nonserviceable-type control elements. A suitable communication gateway device, such as a CAN gateway 28, is also connected to controller 14. Controller 14 is arranged to selectively couple vehicle power to provide operational control of the coupled vehicle components/electrical loads.

Examples of loads controllable by an integrated module of the present invention include one or more of the following: auto shutdown switching, fuel pump switching, starter motor switching, distributed ignition control, head lamp control, turn signal control, reverse lamp control, stop lamp control, front wiper control, horn control, front HVAC blower, cooling fan control, AC condenser fan control, secondary flow valve switching, electric backlight control, diesel cabin heater control, rear fog lamp control, electronic stability brake lamp inhibit, transfer case control, underhood lamp, headlamp leveling, trailer tow lighting control, rear wiper and washer control, and rear HVAC blower control.

With respect to reconfigurability of respective inputs/outputs, the controller is able to assign a function of a particular connector via programming and an internal look-up table. Thus, a common wiring connector/harness can be used with the module even through a particular connector pin is configured to be connected to different components on different vehicle models.

In accordance with one aspect of the present invention, because common control elements are packaged on the base controller board 12, a module 10 can be easily scaled to provide control of optional (and/or higher level content) vehicle electrical loads/components. Such additional loads/components would be controlled by appropriate inputs, outputs, and PWM outputs (denoted as scalable inputs 30, scalable relay outputs 32, and scalable PWM outputs 34 in FIG. 1) added by way of an enlarged controller board 12a and/or connected sub-board. Thus, module 10 is readily packaged to allow easy expansion as needed for use with different vehicle types and models.

In accordance with another aspect of the present invention, the outputs can be selectively controlled by operation of one or more programmable power management switches, such as disclosed in commonly-owned U.S. patent application Ser. No. 10/126,024, which is incorporated by reference herein. The use of programmable power management switches in lieu of electromechanical relays or conventional silicon-type switches allows a module 10 in accordance with the present invention to advantageously control both high current type loads, e.g., the aforementioned front wiper, cooling fan, and/or front HVAC blower, and mid/low current loads with the same module. Such high current loads have not heretofore been controlled together with lower current loads in known power modules because of size and heat issues associated with conventional high current control devices.

Referring now to FIG. 2, a cross-sectional block diagram of a module layout 100 illustrates still another aspect of the present invention. More specifically, a compact design and significant cost savings are realized by locating all high current control devices on both sides of a single base module board 102 formed from a double-sided, high current rated (e.g., a "10 ounce copper") circuit board. Scalability is provided (i.e., optional expansion) such as by using a larger board 102a. Mid and low current devices can be packaged on a lower current rated circuit board 104. Boards 102 and 104 can be positioned within a module housing 106 at right angles relative to each other as depicted in FIG. 2. The respective circuit boards are coupled together via connection 108.

While one or more embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A universal vehicle electric power distribution module comprising:
a plurality of reconfigurable module inputs;
a microcontroller coupled for receipt of signals appearing at the reconfigurable module inputs; and
a plurality of reconfigurable module outputs operative, under control of the microcontroller, to selectively couple electrical power to a plurality of electrical loads in the vehicle corresponding to the plurality of reconfigurable module outputs, wherein the plurality of module outlets includes first and second outputs each controlling delivery of electrical power to its respective load via respective first and second programmable power management switches, the first power management switch programmed for switching electrical power at a first level, and the second power management switch programmed for switching electrical power at a second level.

2. The power distribution module of claim 1 wherein the module inputs and the module outputs are reconfigurable in accordance with contents of a look-up table stored in the microcontroller.

3. The power distribution module of claim 1 further comprising at least one non-reconfigurable input.

4. The power distribution module of claim 1 further comprising at least one non-reconfigurable output.

5. The power distribution module of claim 1 wherein the module is scalable to provide control of additional vehicle electrical loads.

6. The power distribution module of claim 1 wherein the plurality of module outputs includes at least one output controlling delivery of electrical power via pulse width modulation.

7. The power distribution module of claim 1 further comprising a communication bus gateway arrangement.

8. A universal vehicle electric power distribution module comprising:
a plurality of reconfigurable module inputs;
a microcontroller coupled for receipt of signals appearing at the reconfigurable inputs; and
a plurality of reconfigurable module outputs operative, under control of the microcontroller, to selectively couple electrical power to a plurality of electrical loads in the vehicle corresponding to the plurality of reconfigurable module outputs, wherein a first portion of the module outputs deliver power at a first range of current levels and a second portion of the module outputs deliver power at a second range of current levels, and wherein the first portion of module outlets are placed on a first circuit board rated for the first range and the second portion of module outlets are placed on a second circuit board rated for the second range.

9. The power distribution module of claim 8 further comprising a module housing, wherein the first circuit board extends lengthwise transversely to a lengthwise extent of the second circuit board.

10. The power distribution module of claim 9 wherein the first and second circuit boards extend substantially at right angles to each other.

11. The power distribution module of claim 8 wherein the module inputs and the module outputs are reconfigurable in accordance with contents of a look-up table stored in the microcontroller.

12. The power distribution module of claim 8 further comprising at least one non-reconfigurable input.

13. The power distribution module of claim 8 further comprising at least one non-reconfigurable output.

14. The power distribution module of claim 8 wherein the module is scalable to provide control of additional vehicle electrical loads.

15. The power distribution module of claim 8 wherein the plurality of module outputs includes at least one output controlling delivery of electrical power via pulse width modulation.

* * * * *